United States Patent
Fong et al.

(10) Patent No.: US 6,409,145 B1
(45) Date of Patent: Jun. 25, 2002

(54) PLUNGER ASSEMBLY HAVING A PRESET SPRING FORCE PRE-LOAD

(75) Inventors: Keith B. Fong, El Paso, TX (US); Veronica Morales, Cd. Juarez, NM (US); Jeffrey Alan Heinrichs, Dayton, OH (US); Javier Gomez, Cd. Juarez Chih.; Omar Rocha, Juarez, both of NM (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/514,098

(22) Filed: Feb. 28, 2000

(51) Int. Cl.⁷ .............................................. F16K 31/02
(52) U.S. Cl. .................... 251/129.18; 251/337
(58) Field of Search ....................... 251/129.18, 129.15, 251/337

(56) References Cited

U.S. PATENT DOCUMENTS

| | | | | |
|---|---|---|---|---|
| 4,310,123 A | * | 1/1982 | TePastte ............ | 251/129.15 X |
| 5,040,731 A | * | 8/1991 | Yokoyama et al. . | 251/129.15 X |
| 5,118,077 A | * | 6/1992 | Miller et al. ........ | 251/129.18 X |
| 5,209,408 A | * | 5/1993 | Reiter ............... | 251/129.15 X |
| 5,232,167 A | * | 8/1993 | McCormick et al. .. | 251/129.18 X |
| 5,340,032 A | * | 8/1994 | Stegmaier et al. .. | 251/129.18 X |
| 5,577,322 A | * | 11/1996 | Ohshita et al. ..... | 251/129.15 X |
| 5,603,483 A | * | 2/1997 | Reuter et al. ....... | 251/129.15 X |

FOREIGN PATENT DOCUMENTS

| | | |
|---|---|---|
| DE | 3904448 | 8/1990 |
| DE | 4003228 | 11/1992 |
| DE | 19604317 | 8/1997 |
| DE | 4423103 | 12/1997 |
| DE | 29713293 | 12/1997 |
| DE | 19744739 | 4/1999 |
| DE | 19802464 | 7/1999 |
| DE | 19826578 | 12/1999 |

* cited by examiner

Primary Examiner—Kevin Shaver
Assistant Examiner—John Bastianelli
(74) Attorney, Agent, or Firm—Margaret A. Dobrowits

(57) ABSTRACT

A uniformly preset spring force pre-load among a number of identical solenoid actuated valve assemblies (28) by uniquely adjusting the spring pocket length (L) of each respective plunger (12) to accommodate a respective spring (20) which is uniquely mated thereto. This adjustment is accomplished using a two-component plunger (12) consisting of a plunger body (14) having a central bore (22) and a rod (18) slidably located within the central bore. The rod (18) is press-fit into the central bore (22), and the spring pocket includes a portion of the central bore unoccupied by the rod. By pressing the rod (18) a selected distance into the central bore (22), a precisely set spring pocket is obtained which is uniquely correct for a selected spring (20), in that the selected spring is compressed to a precisely preset spring force pre-load. The adjusted plunger (12) and spring (20) are uniquely assigned to each other to collectively form a customized plunger assembly (10) having a preset spring force pre-load, whereupon a valve assembly (28) is manufacturable therewith having the precisely preset spring force pre-load. In carrying-out the adjustment of the plunger (12) with respect to a specific spring (20), the rod is pressed into the bore by a controllable source of force, such as for example provided by a stepper motor (88), and the spring force pre-load is monitored by a load cell (78) to ascertain when the desired spring force pre-load is achieved. Monitoring and force control is preferably automatic via a microcontroller (98), but may be manual.

1 Claim, 4 Drawing Sheets

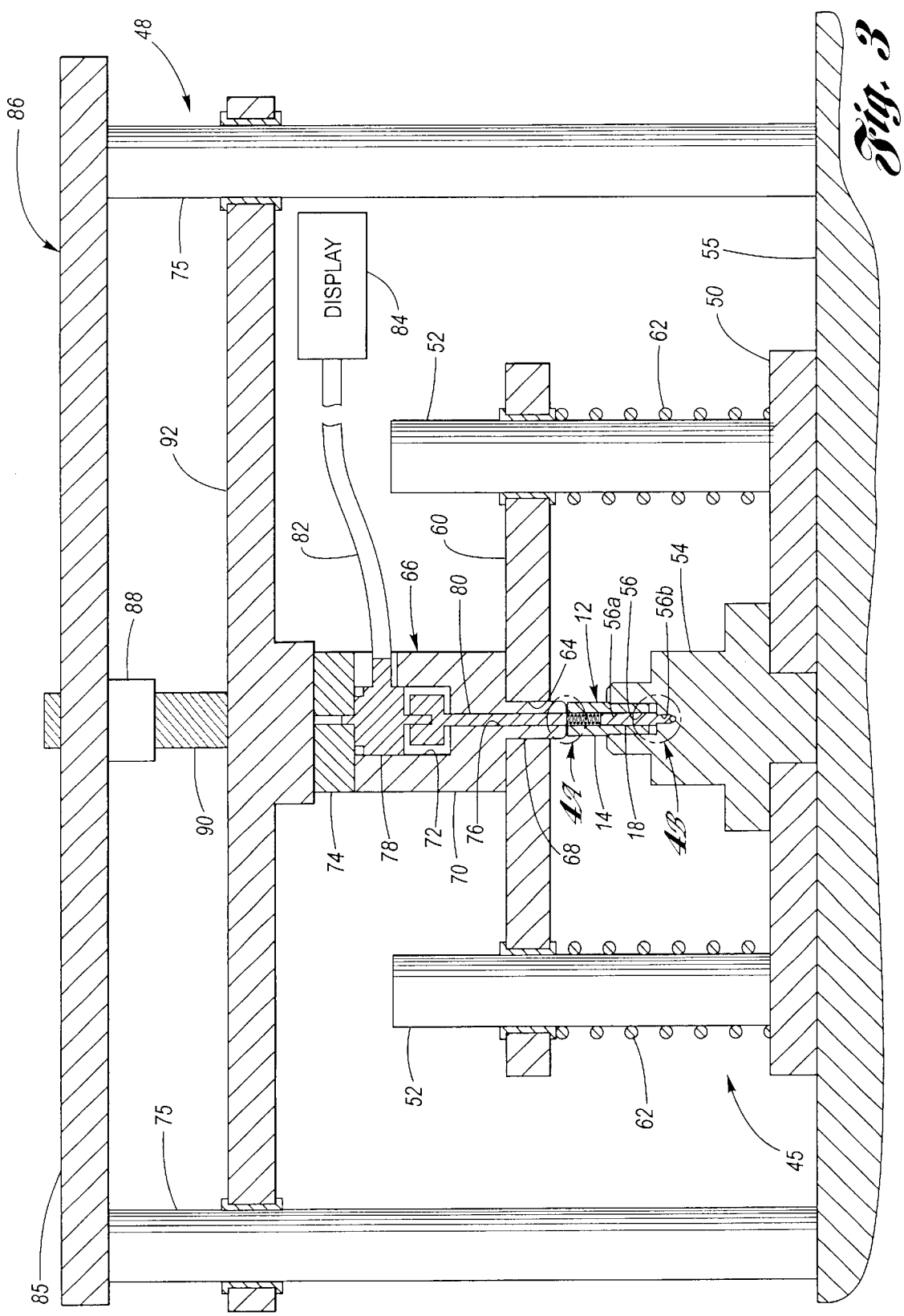

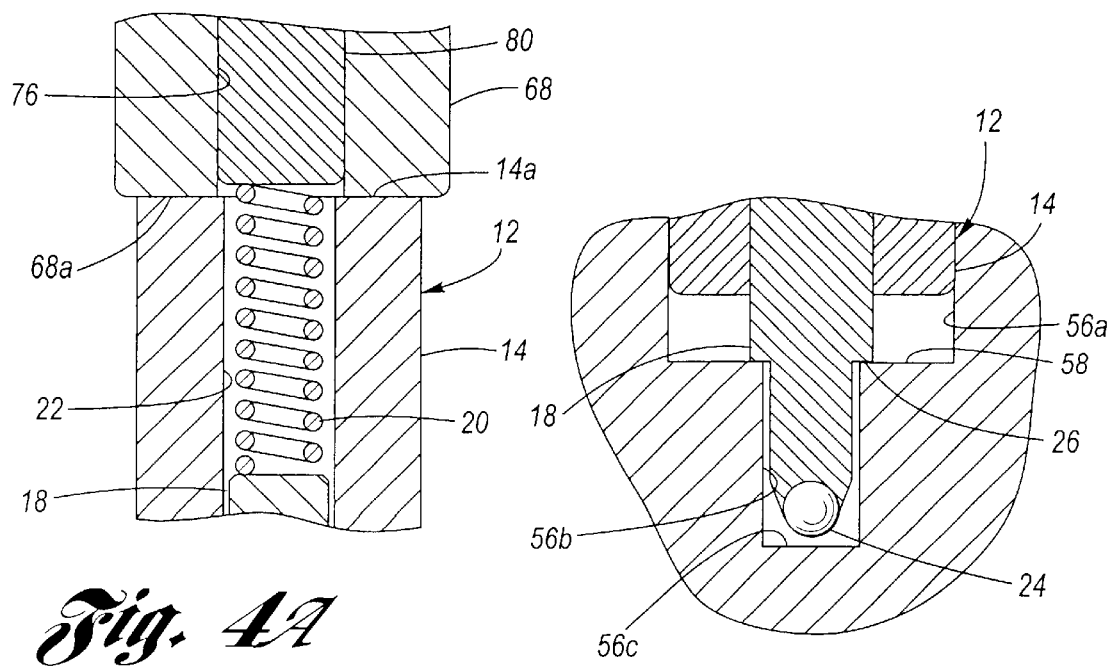
*Fig. 4A*
*Fig. 4B*
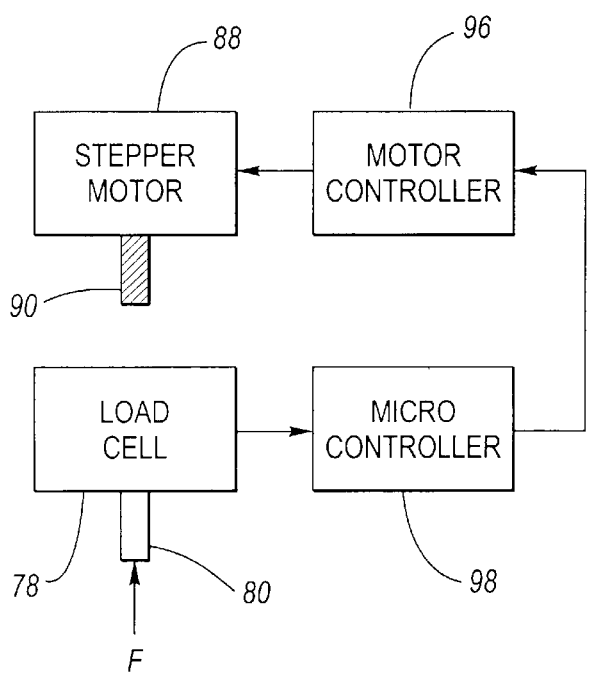
*Fig. 6A*
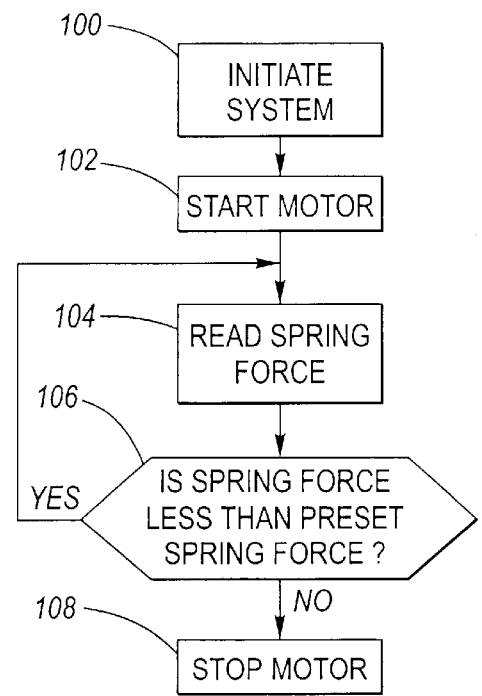
*Fig. 6B*

PLUNGER ASSEMBLY HAVING A PRESET SPRING FORCE PRE-LOAD

TECHNICAL FIELD

The present invention relates generally to solenoid actuated valve assemblies and more specifically to a plunger assembly therefor having a preset spring force pre-load.

BACKGROUND OF THE INVENTION

A problem frequently encountered concerning solenoid actuated valve assemblies is uniformly providing a preset spring force pre-load of the plunger therewithin due to physical inconsistencies among "identical" springs. It is difficult and expensive to provide springs which all have perfectly consistent spring stiffness, in that the spring constant and/or the spring length may be different over a range related to spring manufacturing tolerances. Yet, solenoid actuated valve assemblies control hydraulic fluid flow based upon regulation of a balance of forces acting on the plunger: the hydraulic fluid force and the magnetic field force of the solenoid versus the spring force. Unless the spring force pre-load can be consistently set, an unacceptably wide range of valve seat operational characteristics will result among "identical" valve assemblies. Therefore, the problem of uniformly providing preset spring force pre-load among all identical valve assemblies must be solved.

There are several previously known ways of solving the problem of non-uniform spring force pre-load.

A first known method uses a setscrew to adjust spring force pre-load. The spring compression is varied by turning the setscrew to change the spring pocket length. The disadvantage to this method is that the setscrew increases the size of the valve assembly, introduces a potential leak path, negatively affects the magnetic circuit, can unthread over time, and typically requires an end-of-line adjustment.

A second known method uses shims to adjust spring force pre-load. Shims are placed in an oversized spring pocket to shorten the length of the spring pocket and thereby vary the spring force pre-load. The shims do not affect the magnetic circuit, do not change with time, nor introduce new leak paths. However, shims are difficult to work with and the adjustment process is time consuming because of the discrete steps of inserting shims until the target spring force pre-load is met.

A third known method uses in-line precision machining to create a spring pocket which will create the correct spring force pre-load for a specific spring. Precision machining is expensive and time consuming.

Accordingly, there is a clearly felt need in the art for providing valve assemblies all having uniform spring force pre-load which has none of the aforementioned disadvantages.

SUMMARY OF THE INVENTION

The present invention provides a uniformly preset spring force pre-load among a number of identical solenoid actuated valve assemblies by uniquely adjusting the spring pocket length of each respective plunger to accommodate a respective spring which is mated thereto. This adjustment is accomplished using a two-component plunger consisting of a plunger body having a central bore and a rod slidably located within the central bore. The rod is press-fit such that slidable movement of the rod relative to the plunger body can only occur if a predetermined minimum of force is applied, which force is considerably more than that capable of being exerted by the compression force of the spring.

The spring pocket includes a portion of the central bore unoccupied by the rod. Accordingly, by pressing the rod a selected distance into the central bore, a spring pocket is obtained which is uniquely correct for a selected spring, in that the selected spring is compressed to a precisely preset spring force pre-load. The adjusted plunger and spring are uniquely assigned to each other to collectively form a customized plunger assembly having a preset spring force pre-load, whereupon a valve assembly is manufacturable therewith having the precisely preset spring force pre-load.

In caring-out the adjustment of the plunger with respect to a specific spring, the rod is pressed into the central bore by a controllable source of force, such as for example provided by a stepper motor, and the spring force pre-load is monitored to ascertain when the desired spring force pre-load is achieved. Monitoring and force control is preferably automatic, but may be manual.

Accordingly, it is an object of the present invention to provide a plunger assembly which has a preset spring force pre-load.

This and additional objects, advantages, features and benefits of the present invention will become apparent from the following specification.

BRIEF DESCRIPTION OF THE DRAWINGS

FIG. 3 is a partly cross-sectional view of an apparatus for adjusting a plunger to suit a specific spring and thereby provide a customized plunger assembly in accordance with the present invention.

FIG. 4A is an enlarged cross-sectional view, seen at circle 4A of FIG. 3.

FIG. 4B is an enlarged cross-sectional view, seen at circle 4B of FIG. 3.

FIG. 6A is a block diagram illustrating an electrical circuit for automatically driving a stepper motor in accordance with the present invention.

FIG. 6B is a flow chart illustrating operation of the micro-controller of FIG. 6A.

DESCRIPTION OF THE PREFERRED EMBODIMENT

Figure 1:
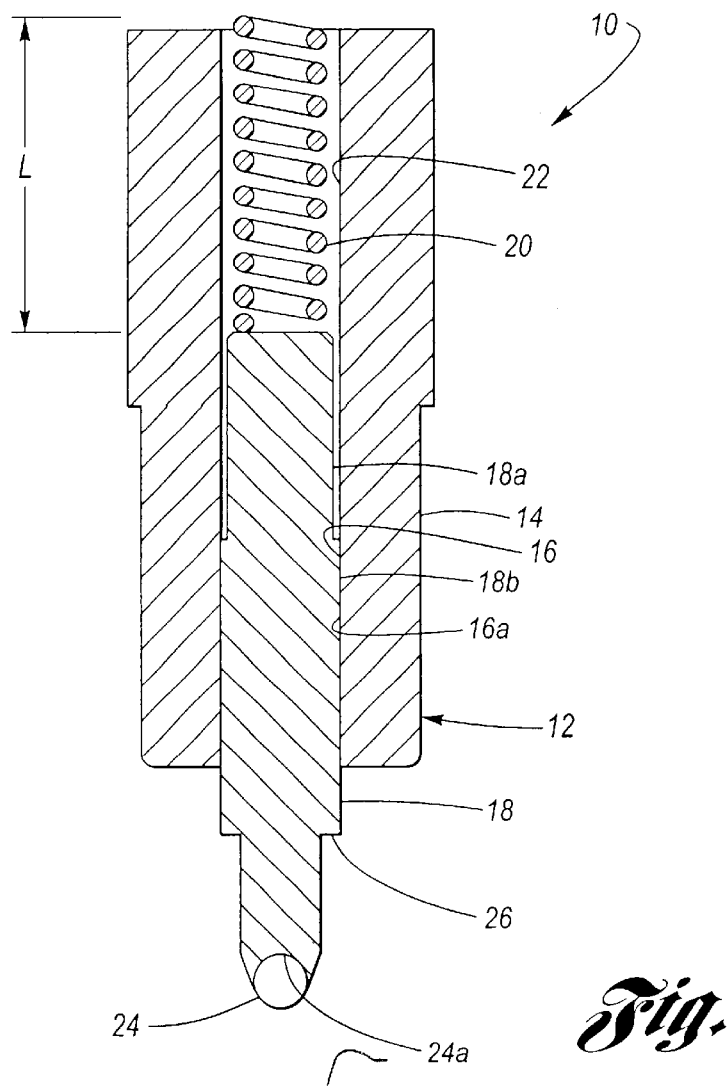
FIG. 1 is a cross-sectional view of a plunger assembly in accordance with the present invention.

Referring now to the Drawing, FIG. 1 depicts a plunger assembly 10 according to the present invention. The plunger assembly 10 includes a plunger 12 composed of a plunger body 14 having a central bore 16 and a rod 18 press-fit into the central bore, and a spring 20. The rod 18 includes a smaller diameter rear portion 18a and a larger diameter forward portion 18b, wherein the smaller diameter portion easily slides in the central bore, but the larger diameter portion has a press-fit with respect to the central bore. A spring pocket 22 includes the central bore 16 where the rod 18 is absent. Accordingly, the length L of the spring pocket 22 is adjustable by sliding of the rod 18 relative to the plunger body 14, wherein the press-fit of the larger diameter portion 18b provides sufficient coefficient of static friction with respect to the bore wall 16a of the central bore 16 such that required is application of at least a minimum force to slide the rod relative to the plunger body, which minimum force greatly exceeds any possible compression force that the spring 20 may apply to the rod. A ball 24 is connected to a forward end of the rod 18, as for example by crimping at a ball seat 24*a*. The ball 24 serves as an hydraulic fluid seal when pressed into a valve seat, as will be discussed momentarily. An annular shoulder 26 is formed a small distance from the forward end at a location external to the plunger body 14, the purpose of which will become clear shortly.

Figure 2:
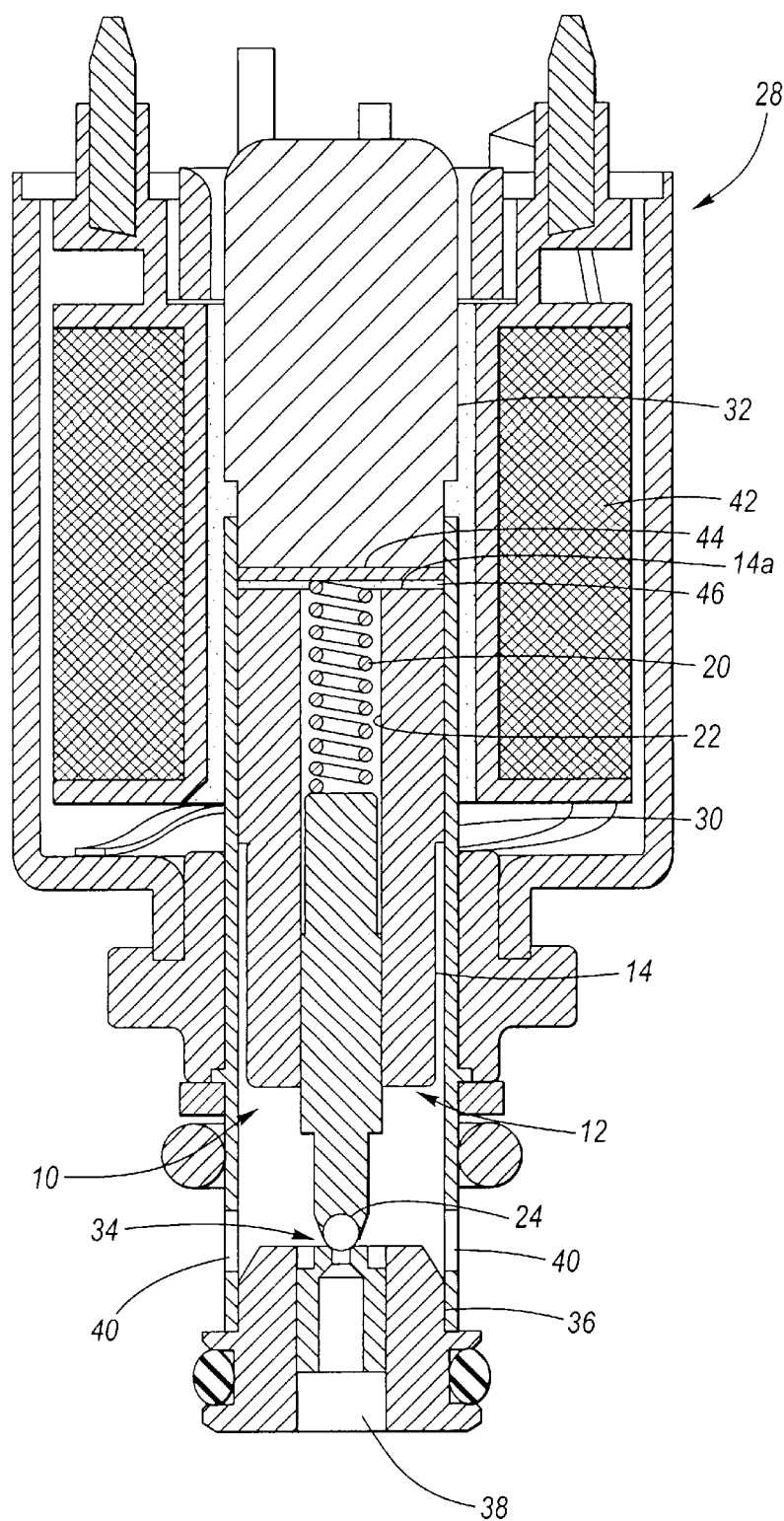
FIG. 2 is a cross-sectional view of an assembled solenoid actuated valve assembly in accordance with the present invention.

Referring now to FIG. 2, a solenoid actuated valve assembly 28 is depicted. The aforesaid plunger assembly 10 is located within a tube 30, wherein the plunger 12 is slidable therein. A rearward end of the tube 30 is welded to a main body 32, the main body being composed of a magnetic material. The ball 24 is seated at a valve seat 34, and is forced thereagainst by compression force of the spring 20. The valve seat 34 forms part of a valve body 36 which includes an inlet 38 and is connected to a forward end of the tube 30. An outlet 40 is formed in the tube 30 adjacent the valve body 36. A solenoid 42, when energized, exerts a magnetic force on the plunger 12 in a direction away from the valve seat 34 and toward the main body 32.

Assembly of the solenoid actuated valve assembly 28 proceeds as follows. The valve body 36 and the tube 30 are connected together by welding. The plunger assembly 10 is placed into the tube 30 with the ball 24 at the valve seat 34. The rearward end of the tube 30 is placed onto a portion of the main body 32 and the rear end 14*a* of the plunger body 14 is caused, against compression force of the spring 20, to firmly abut a magnetic circuit spacer 44 which in turn firmly abuts the main body. Now the tube 30 is backed off a predetermined distance to create a preset plunger travel cavity 46, whereupon the rearward end of the tube is welded to the main body. In this manner of attaching the tube, the range of varying lengths of customized plunger assemblies 10 is accommodated during assembly of each solenoid actuated valve assembly.

In operation of the solenoid actuated valve assembly 28, hydraulic fluid force at the inlet 38 tends to unseat the ball 24 in a direction toward the main body, which fluid force is overcome by compression force of the spring 20. When the solenoid 42 is energized, the magnetic circuit imparts a magnetic force on the plunger 12 toward the main body in a direction which is in the same direction as the force applied by the hydraulic fluid to the ball at the inlet side of the valve seat 34. The hydraulic fluid force and magnetic force overcome the spring compression force, resulting in the ball 24 being unseated (that is, unsealed) from the valve seat 34 as the plunger 12 moves therefrom toward the main body 32, whereupon hydraulic fluid flows from the inlet 38, through the valve seat 34 and out the outlet 40.

FIGS. 3 through 6B depict views of a preferred apparatus to provide a customized plunger assembly 10, wherein FIG. 3 generally depicts the apparatus, including a fixture assembly 45 and a press 55.

The fixture assembly 45 has a base plate 50 secured to a base 55. The base plate 50 fixedly supports four upstanding guide rods 52 (two being visible), as well as a nest body 54 located medially therebetween. The nest body 54 has a centrally disposed plunger cavity 56 which includes a plunger body cavity portion 56*a* and a rod cavity portion 56*b*. The periphery of the rod cavity portion 56*b* forms an annular shelf 58. The plunger cavity 56 receives the plunger 12, wherein the annular shoulder 26 of the rod 18 abuts the annular shelf 58, and the ball 24 is spaced from the floor 56*c* of the rod cavity portion 56*b*.

A mobile plate 60 is slidably interfaced with the four guide rods 52 at each corner thereof, and is suspended above the nest body by guide rod springs 62, one for each guide rod, respectively. Interfaced centrally at an opening 64 of the mobile plate 60 is a fixture assembly 66 including a ram body 68, a frame body 70 having a frame cavity 72, and a frame plate 74 is screwed to the frame body so as to span the frame cavity, wherein the ram and frame bodies are preferably integral. A fixture assembly bore 76 extends from the ram face 68*a* of the ram body 68 to the frame cavity 72 and threadably connected to the frame plate 74. A conventional load cell 78 for measuring compressive force is located within the frame cavity 72. A sensor pin 80 extends from the load cell 78, through the fixture assembly bore 76 to a location adjacent the ram face 68*a*, the distance of separation being equal to the aforementioned back-off distance involved when the tube 30 is attached to the main body 32 (see FIGS. 3 and 4A). A cable 82 exits the frame cavity 72 and provides an output signal from the load cell 78 that is indicative of the present compression force, which may include being readable on a digital display 84. The load cell 78 is sandwiched between the frame plate 74 and the sensor pin 80, so that compressive force applied to the sensor pin toward the frame plate is detectable by the load cell.

The press 86 depicted in FIG. 3 is preferred, but may be in the form of any controllable source of downward force for driving the ram face 68*a* against the rearward end 14*a* of the plunger body 14. A set of four guidance rods 75 (two being visible) are supported on the base 55 independently of the base plate 50, wherein the fixture assembly 45 is medially disposed relative thereto. A top plate 85 is connected to the guidance rods 75, and a stepper motor 88 is connected to the top plate. The stepper motor 88 has a threaded shaft 90, the end of which is abuttable against a ram plate 92. Each of the four corners of the ram plate 92 are slidably mounted on a respective guidance rod 75, wherein the ram plate transfers force from the threaded shaft 90 of the stepper motor 88 to the frame plate 74. The independence of the press 86 and the fixture assembly 45 is preferred so as to render force misalignment issues therebetween moot, but the press and fixture assembly may be otherwise constructed as a single integrated assembly.

In operation of the apparatus 48, after the plunger 12 of the plunger assembly 10 is placed into the plunger cavity 56, the ram face 68*a* is brought into abutment with the rearward end 14*a* of the plunger body 14, wherein the spring 20 is adjacent the rod 18 at one end and abuts the sensor pin 80 at the other end (the fixture assembly bore 76 being cross-sectionally at least as large as the central bore 22), as shown at FIG. 4A. The stepper motor 88 is actuated in steps to cause the rod 18 to be slid in the central bore 16 until the precisely predetermined spring force pre-load of the spring 20 is detected by the load cell 78. Now the stepper motor is stopped, whereupon a customized plunger assembly has been fashioned. Control of the stepper motor may be effected manually using the display 84 indicating the compression force, or automatically.

Figure 5:
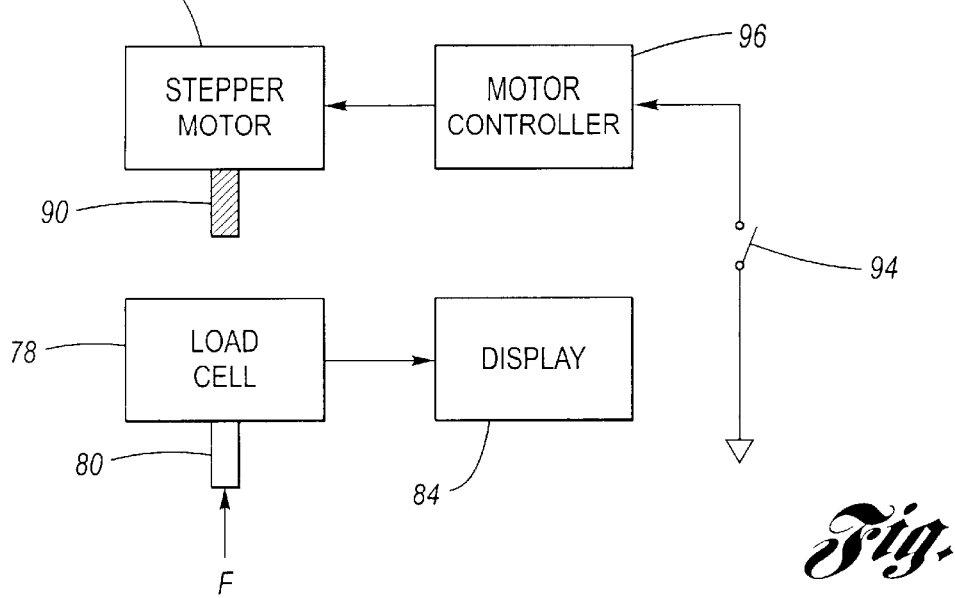
FIG. 5 is a block diagram illustrating an electrical circuit for manually driving a stepper motor in accordance with the present invention.

As depicted at FIG. 5, the stepper motor 88 is manually actuated via the closing of a momentary switch 94. An operator closes a momentary switch 94 which connects power to a stepper motor controller 96 that controls rotation of the stepper motor 88. Rotation of the threaded shaft 90 causes the plunger body to slide relative to the rod and thereby compress the spring. The resulting spring compression force F is directed by the sensor pin 80 to the load cell 78. The value of the spring compression force F is read by the operator at the display 84. When the operator reads a spring compression force F equal to the preset value of spring force pre-load, the operator opens the momentary switch 94 causing the stepper motor to stop and freezing the rod at that position in the central bore of the plunger body.

As depicted at FIG. 6A the stepper motor 88 is automatically actuated via a micro-controller 98. With added reference to FIG. 6B, upon initialization at execution block 100, the micro-controller 98, at execution block 102, starts rotation of the stepper motor 88 via a stepper motor controller 96 (which may be independent of, or integrated with, the micro-controller). Rotation of the threaded shaft 90 causes the plunger body to slide relative to the rod and thereby compress the spring. The resulting spring compression force F is directed by the sensor pin 80 to the load cell 78. The value of the spring compression force F is read by the micro-controller at execution block 104. The micro-controller then inquires at inquiry block 106 whether the present value of spring force is less than the preset spring force pre-load. If yes, then the micro-processor continues rotation of the stepper motor; if no, then the preset spring force pre-load is achieved and the micro-controller stops the stepper motor at execution block 108, thereby freezing the rod at that position in the central bore of the plunger body.

While particular embodiments of the invention have been shown and described, it will be obvious to those ordinarily skilled in the art that changes and modifications may be made without departing from the invention in its broader aspects; and, therefore, the aim in the appended claims is to cover all such changes and modifications as fall within the true spirit and scope of the invention.

What is claimed is:

1. A valve assembly comprising:

a tube having a forward end and an opposite rearward end;

a valve seat connected to said forward end;

a main body connected to said rearward end, said main body having an end, an abutment being located in said tube at said end of said main body;

a plunger assembly located within said tube, said plunger assembly comprising:
    a plunger body having a central bore;
    a rod partially received in said central bore, said rod having a first end and an opposite second end, wherein said first end is located in said central bore, and wherein a spring pocket is defined between said first end and said abutment, said plunger body and said rod collectively forming a plunger; and
    a spring located in said spring pocket;

seal means for sealing said valve seat in response to said spring compression force, said seal means being located at said second end of said rod; and actuation means for selectively forcing said plunger toward said main body, whereupon movement of said rod toward said main body results in said seal means becoming unsealed in relation to said valve seat;

wherein a press-fit between said rod and said central bore provides a compression of said spring between said first end and said abutment such that a resulting spring compression force equals a preset spring force pre-load; and wherein said connection of said rearward end of said tube to said main body is selectively positioned relative to each other so as to provide a predetermined plunger travel cavity between said plunger body and said abutment.

* * * * *